United States Patent [19]

Shurtz, II et al.

[11] Patent Number: 5,793,505
[45] Date of Patent: Aug. 11, 1998

[54] FABRY-PEROT MULTIWAVELENGTH INFRARED FILTER WITH ARTIFICIAL DIELECTRIC

[75] Inventors: Richard R. Shurtz, II, Oakton, Va.; Edward J. Sharp, Fort Washington, Md.

[73] Assignee: The United States of America as represented by the Secretary of the Army, Washington, D.C.

[21] Appl. No.: 845,670

[22] Filed: Mar. 11, 1986

[51] Int. Cl.$^6$ .................................................... G02F 1/16
[52] U.S. Cl. .......................... 359/885; 359/589; 359/601; 356/352
[58] Field of Search ............... 330/4, 3; 350/1.6, 350/1.7, 311; 372/103, 703; 359/589, 601, 885

[56] References Cited

U.S. PATENT DOCUMENTS 4,529,942 7/1985 Patel ........................................... 330/4.3

OTHER PUBLICATIONS

Halah et al, "Low-Temperature . . . Filters", Oct. 15, 1979, Appl. Opt., vol. 18, #20, pp. 3526–3532.

Whitcomb et al, "Low-Pass Interference . . . Astronomy", Jan. 15, 1980, Appl. Opt., vol. 19, #2, pp. 197–198.

Danilewicz et al, "Hybrid metal Mess . . . Lasers", Mar. 1976, Appl. Opt., vol. 15, #3, pp. 761–767.

Danilewicz et al, "Hybrid Output Mirror . . . Lasers", Apr. 1975, Opt. Comm., vol. 13, #4, pp. 366–369.

*Primary Examiner*—Nelson Moskowitz
*Attorney, Agent, or Firm*—Max L. Harwell; Aubrey J. Dunn

[57] ABSTRACT

A filter is constructed consisting of an optical cavity having at least one element which is a square mesh of highly-conductive metal on a transparent substrate. The mesh openings are defined by relatively narrow conductors of the metal. The mesh feature size, as determined by the sum of the conductor width and square size length, is below the diffraction limit for incoming radiation of interest.

3 Claims, 4 Drawing Sheets

FABRY-PEROT MULTIWAVELENGTH INFRARED FILTER WITH ARTIFICIAL DIELECTRIC (U) The invention described herein may be manufactured, used, and licensed by the U.S. Government for governmental purposes without the payment of any royalties thereon.

BACKGROUND OF THE INVENTION

This invention is in the field of devices for protecting optical photodetectors. These detectors include various thermal and quantum mechanisms, including the human eye. The devices prevent damage to the detectors by high-intensity optical radiation, such as that from a laser. Various implementations of protective devices against lasers and other high intensity sources have been made and proposed and include mechanical, electro-optical, and filter schemes. For various reasons, most of these devices provide inadequate protection from a high-power laser, such as a $CO_2$ laser, and some of them block all radiation, including desired radiation. A $CO_2$ laser has an extremely rapid pulse rise, and hundreds of spectral lines. In order to protect against such a laser, a device must be capable of operating extremely rapidly (which excludes mechanical and many electro-optical shutters) and must be capable of blocking or diverting all the spectral lines without affecting other radiation. One might be tempted to use a tuned filter of the Fabry-Perot (F-P) type against a $CO_2$ laser, in the belief that such a filter could accommodate harmonically-related spectral lines of the laser. Unfortunately, the response peaks of known F-P filters vary from $CO_2$ spectral lines, except for some predetermined central lines. In order to overcome this disadvantage of F-P filters, we have made two previous inventions, now pending in the U.S. Patent Office, and bearing Ser. Nos. 492,063 and 520,268, filed respectively on Apr. 28, 1983 and Jul. 29, 1983. These previous inventions used dispersive optical materials to tune F-P filters to match more closely $CO_2$ spectral lines. The instant invention takes advantage of dispersion also, but uses additional dispersion elements, which we call artificial dielectrics.

SUMMARY OF THE INVENTION

The invention is a unique F-P filter for selectively transmitting or reflecting a particular line spectrum. Normal F-P mirrors are either replaced by a metallic optical mesh with square holes or a mesh in the form of square metallic islands in a regular array. The mesh shifts the phase of reflected waves. Such meshs may also be used in conjunction with the normal F-P mirrors. In either event, the phase shift induced by the mesh is a strong function of wavelength, thus causing desired F-P cavity dispersion.

DESCRIPTION OF PREFERRED EMBODIMENTS

Before a detailed description of the invention is given, a few general notes about artificial dielectrics are in order. We use the term "artificial dielectric" to cover those devices which are not true optical materials, but which cause dispersion of incident radiation as if they were such materials. The need for such materials exists, particularly in the 8 to 12 micron region of the infrared spectrum, for which optically active transparent materials are rare. We make such artificial dielectrics in the form two-dimensional highly-conductive metallic meshes on transparent substrates. The mesh feature size and spacing is made small compared to input wavelength to avoid diffractive effects. The collective interaction of the arrayed conductive unit cells alters the phase of the transmitted and reflected plane waves. The general properties of meshes can be conviently described using circuit theory. Incoming radiation creates an electro-magnetic field distribution within the open areas of the mesh, which satisfies the appropriate boundry conditions. These aperture fields induce currents in the inventive array such that the array may be considered inductive. Specifically, a mesh with relatively large square openings is inductive because of the openings. The equivalent circuit of such a mesh is the parallel connection of a capacitor and an inductor; the parameters of the circuit may be derived by using transmission line theory or scattering theory. The input impedance of the equivalent circuit, with transmission line theory, may be used to predict the amplitude and phase of reflected and transmitted waves. If the input impedance of the periodic structure is adjusted to match the 377 ohm impedance of free space, all radiation is forward scattered and none reflected. In actual practice, this impedance is selected to produce the appropriate reflectance, as given by $(Z_o-Z_m)^2/(Z_o+Z_m)^2$, wherein $Z_o$ is the impedance of free space and $Z_m$ is the input impedance of the array. In order for an artificial dielectric mirror to avoid diffraction effects, the unit cell size must be on the order of $2\lambda/3n$ or less, where $\lambda$ is radiation wavelength, and n is the mesh substrate index of refraction. If this is not the case, the structure will diffract at the Bragg angle, the same as X-rays are diffracted by real dielectrics when the radiation wavelength is the same order as the unit cell (crystal interatomic spacing). The mesh can be placed on any substrate which is transparent to the input radiation. For example, polymers, quartz, or glasses in the visible and near infrared; germanium, zinc, selenide, calcium flouride, or zinc telluride in the 8–12 micron region; or rexolite, TPX or saphire in the millimeter wave region.

Figure 1A:
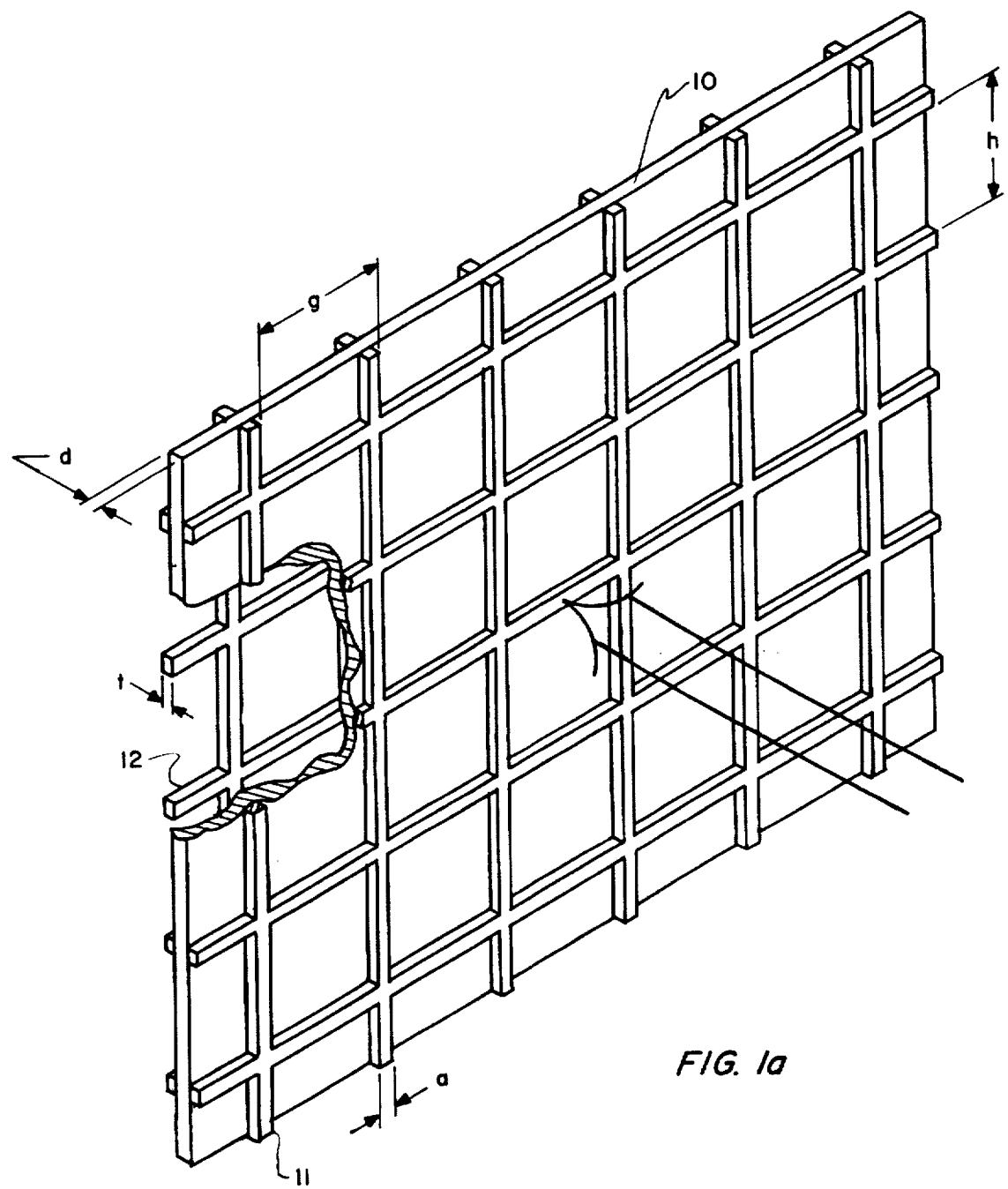
FIG. 1a is a schematic showing of one embodiment of the invention, which operates in a reflective mode.

Going now from the general to the specific, we first look at FIG. 1a. This reflective filter consists of substrate 10, with meshes 11 and 12 on either side. As can be seen, the mesh is perforated with square holes in a regular pattern. The mesh is made of a highly conductive metal, such as gold. The unit cell dimensions g and h (g=h) are based on the diffraction limit for particular wavebands and are chosen for the smallest wavelength in each waveband. Conductor width, designated a, is selected to be one tenth of the unit cell size, and the mesh thickness t should exceed approximately two optical skin depths in order to behave as a metal. Typical mesh dimensions and materials are given below in Table I. The highly conductive metal for the mesh is chosen to avoid plasma resonance effects (i.e. plasmons) which make a metal lossy at high frequencies. The plasmon effect usually occurs at frequencies higher than the diffraction limit discussed above. The substrate, which defines the optical cavity length, may be chosen to be relatively nondispersive or highly dispersive, should be chosen from materiels having minimum index of refraction. If dispersive, the material should be chosen to make the filter response peaks match the spectra of radiation in a F-P cavity, as taught, for example, in our U.S. Patent applications mentioned above.

TABLE I(S)

| Waveband | 0.5 μm | 3–5 μm | 8–12 μm | 1 mm |
|---|---|---|---|---|
| Substrate Material | Glass | $CaF_2$ | $CaF_2$ or CaF | TPX |
| Substrate index of refraction | 1.5 | 1.4 | 1.4 or 1.3 | 1.5 |
| g, h (μm) | 0.2 | 1.4 | 4.1 | 450 |
| a (μm) | 0.02 | 0.14 | 0.4 | 45 |
| t (Å) | 500 | 1000 | 2000 | 10,000 |

The substrate thickness d is critical only in the FIG. 1a embodiment, since it there determines cavity length. For an 8–12 μm F-P intended to remove all of the lines of an incident $CO_2$ laser beam, one would make d≅2 mm. This thickness corresponds to an order number of ≅520 for 10 μm radiation; 520 best matches the spacing of the $CO_2$ lines, as derived from the following equation:

$$2nd(\cos\theta) = m\lambda,$$

wherein n is the index of refraction of the substrate (1.3 if CaF is used), cos θ is the cosine of the incident radiation angle (1 for normal radiation), m is the order number, and λ is 10 μm. We thus find that m=2(1.3)(2 mm)(1)/10 μm=520. Order No. 520 is selected initially to provide a close match to the multiplicity of $CO_2$ laser lines. The slight differences between this match of the filter to actual laser lines are compensated for with the dispersion of the substrate and/or the dispersion of the mesh.

Clearly, the dimensional requirements of Table I constrain its use to wavelengths of three microns or greater if conventional ultraviolet photo-lithography is used. If, however, e-beam or x-ray lithographic techniques are used, much smaller mesh dimensions are realizible and consequently meshes usable at shorter wavelengths. The FIG. 1a filter is used in the reflective mode, i.e., it may replace one or both mirrors of a F-P cavity, and determines the F-P notch locations.

Figure 3:
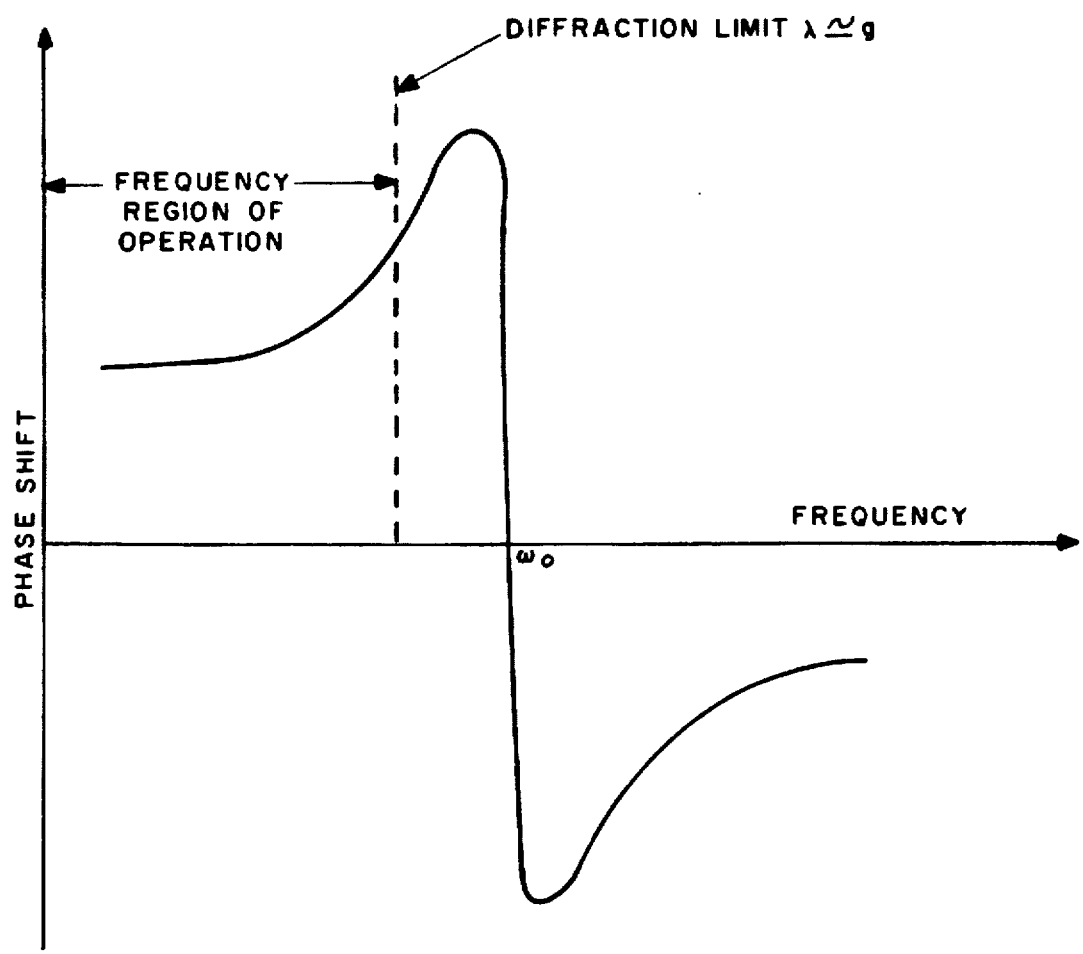
FIG. 3 is a plot of phase shift of reflected waves versus frequency for reflective embodiments of the invention.

The filter structure just described produces a phase shift which depends upon the wavelength of input radiation; the degree of phase dispersion depends upon the location and strength of the circuit resonances designed into the filter structure. A plot of reflective phase shift versus frequency of the filter is shown in FIG. 3. As can be seen, the phase shift increases as the mesh resonance $\omega_o$ is approached. The value of $\omega_o$ is determined by the mesh pattern and the various dimensions of the mesh, and is selected based on the operational bandwidth of the desired F-P cavity. For an 8–12 μm F-P, $\omega_o$ would be near 12.0 μm. The phase shift of a transmitted wave behaves in a similar manner. The location of the primary resonance or resonances is the primary method used to design a filter with a particular dispersive behavior.

Figure 1B:
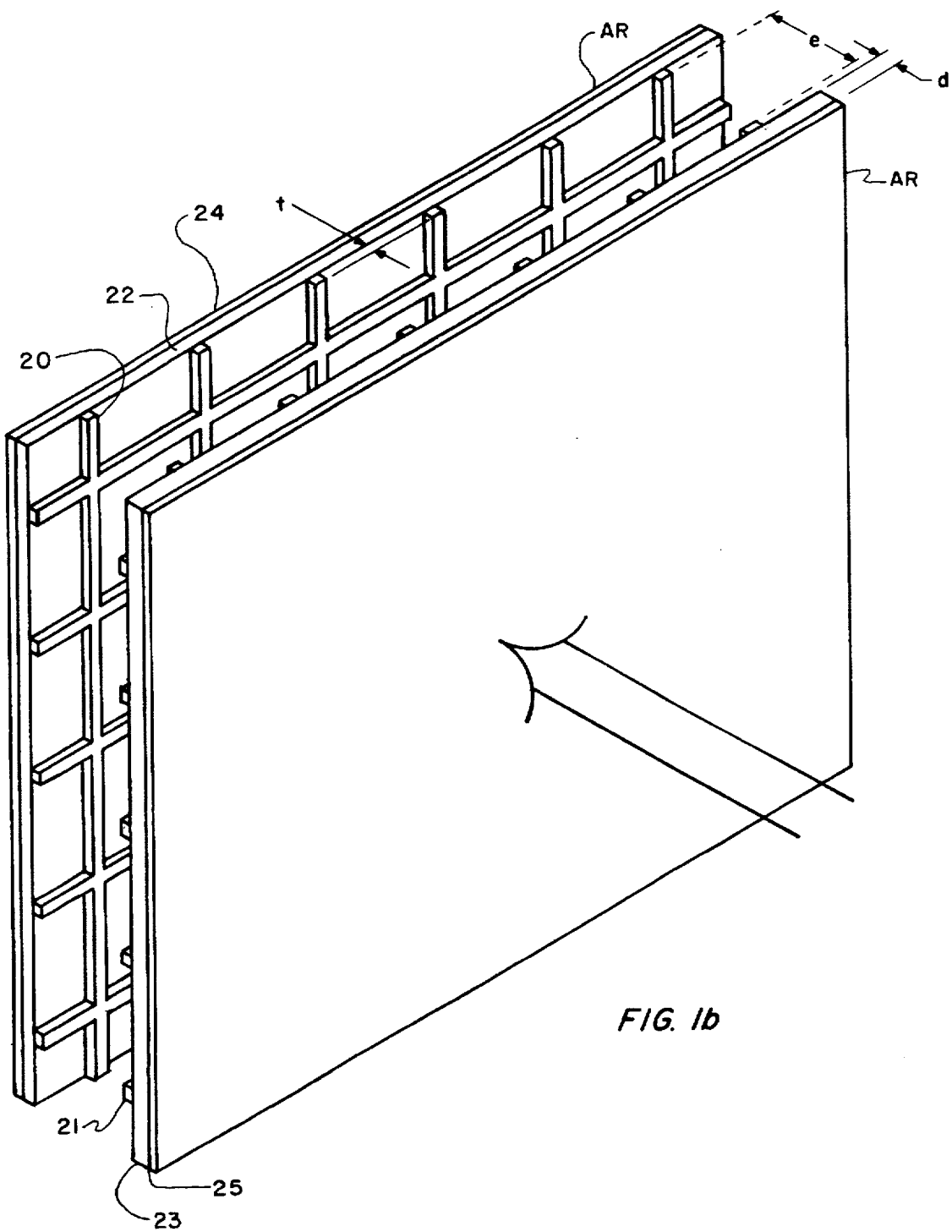
FIG. 1b is a schematic showing of another embodiment of the invention, which also operates in a reflective mode.

Turning now to FIG. 1(b), we see a reflective filter structure in which the substrates for the meshes are external to the optical cavity. The filter consists of meshes 20 and 21 similar to mesh 11 and 12 of FIG. 2, on substrates 22 and 23. On the opposite sides of these substrates are antireflection layers 24 and 25. The distance e between the meshes may be varied as desired to tune the filter, but has a nominal exemplary value of ≅2 mm for the 8–12 μm spectral range.

Figure 2:
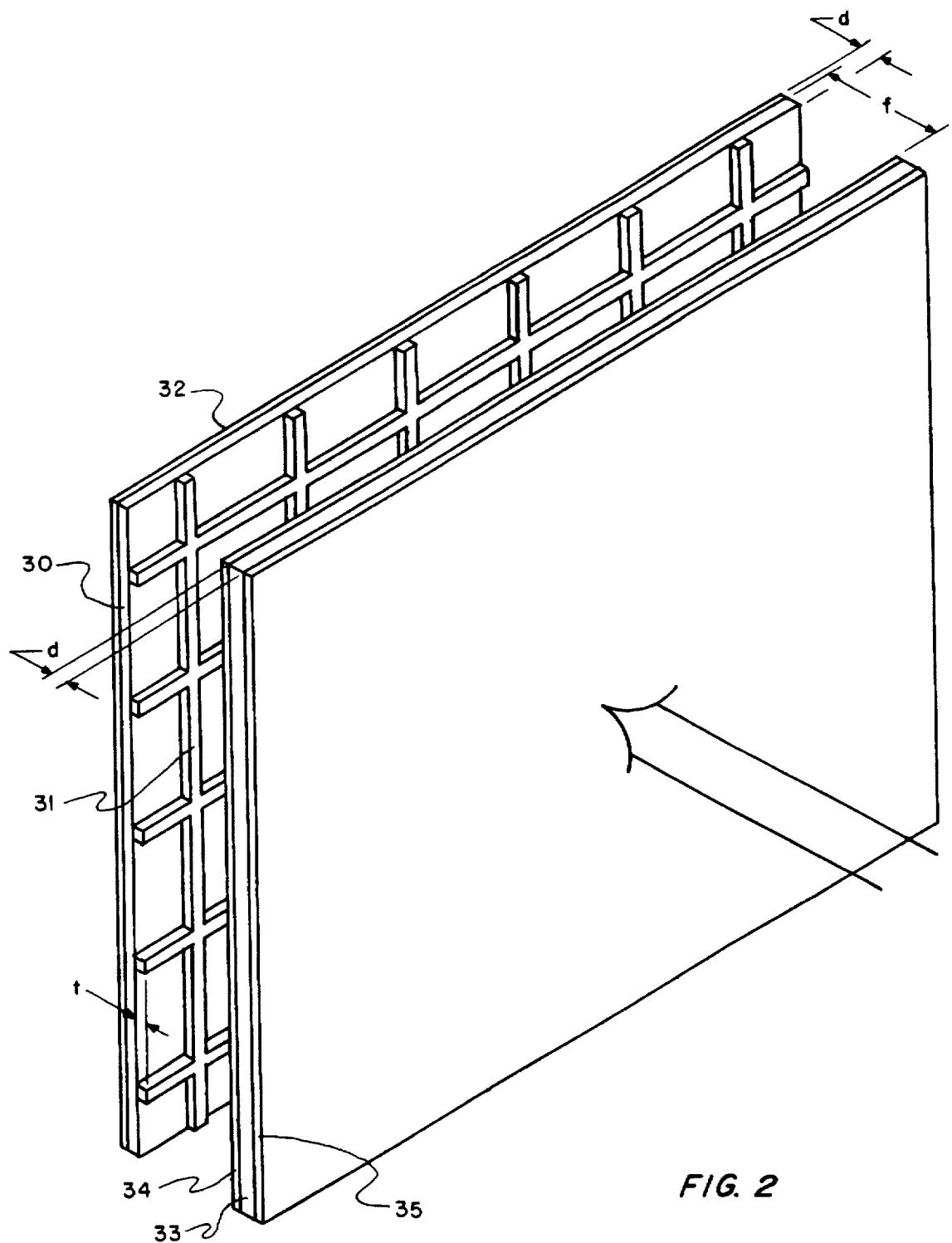
FIG. 2 is a schematic showing of yet another embodiment of the invention, which operates in a transmittive mode.

FIG. 2 shows a filter usable in the transmittive mode. This filter consists of a portion comprising substrate 30 with mesh 31 on one side and partially reflective layer 32 on the other side, and a portion comprising substrate 33 with reflective layer 34 on one side and antireflection layer 35 on the other side. The length f is between non-dispersive mirrors 32 and 34. This configuration has the advantage of allowing both substrate dispersion (if used) and cavity length tuning to be used for designing the filter properties A nominal value for f is ≅2 mm for 8–12 μm bandwidth designed for the $CO_2$ laser spectrum. The substrate thickness d for this embodiment and for the previous embodiment can be chosen depending on the dispersion required for a specific filtering task. Generally, d is made relatively thin so as to be transmitting to incident radiation, but thick enough to support its mesh. The value of f (and of e in the previous embodiment) defines cavity length and would replace d in the equation set forth above such that:

$$2n(e \text{ or } f)\cos\theta = m\lambda.$$

Obviously, the values of e and f depend on the filtering task and the wavelength of incoming radiation. In the 8–12 μm region, both e and f would be 2 mm for filtering $CO_2$ laser lines, corresponding to an order number of about 520.

In each of the embodiments of the invention described above, the broad arrow is intended to indicate the direction of incoming radiation. This radiation is normal to the filter planes.

Although we have shown our invention as an open mesh on a substrate, similar results may be obtained with a regular array of square islands or mesas of highly-conductive metal on a substrate, such that the unit cell size is made as described above for the mesh.

We claim:

1. A dispersive normal transmittive Fabry-Perot multi-wavelength optical filter for incident electromagnetic radiation including:

a transparent substrate having two planar and parallel sides, and a respective metallic mesh on each of said sides, whereby said substrate has a thickness between said sides of some multiple of at least one wavelength of said radiation, and said mesh has square openings between relatively narrow metallic conductors, such that the mesh feature size, as defined by said openings and said conductors, is below the diffraction limit for said wavelength and imparts dispersion to said filter.

2. A dispersive normal transmittive Fabry-Perot multi-wavelength optical filter for incident electromagnetic radiation including:

first and second transparent substrates each having first and second planar and parallel side, with a metallic mesh on each first side and an antireflection layer on said second side, whereby said first sides are juxtaposed and parallel, and whereby each substrate has a thickness between its sides of some multiple of at least one wavelength of said radiation, and said mesh has square openings between relatively narrow metallic conductors, such that the mesh feature size, as defined by said openings and said conductors, is below the diffraction limit for said wavelength and imparts dispersion to said filter, and whereby said meshes are separated from each other by a distance of some multiple of at least one wavelength of said radiation.

3. A dispersive normally reflective Fabry-Perot multi-wavelength optical filter for incident electromagnetic radiation including:

a first transparent substrate having first and second planar and parallel sides, with a metallic mesh on said first side and a partially reflective layer on said second side;

a second transparent substrate having a first said of said first substrate, and having a partially reflective layer thereon, and having a second side with an antireflection layer thereon, whereby each substrate has a thickness between its first and second sides of some multiple of at least one wavelength of said radiation, and said mesh has square openings between relatively narrow metallic conductors, such that the mesh feature size, as defined by said openings and said conductors, is below the diffraction limit for said wavelength and imparts dispersion to said filter.

* * * * *